(12) United States Patent
Chen et al.

(10) Patent No.: US 9,787,563 B2
(45) Date of Patent: *Oct. 10, 2017

(54) NETWORK INTERFACE AND DETECTION MODULE TO ENABLE NETWORK COMMUNICATION WITHIN INFORMATION HANDLING SYSTEMS

(71) Applicant: Dell Products, LP, Round Rock, TX (US)

(72) Inventors: Lei Chen, Shanghai (CN); Tao Zhang, Shanghai (CN)

(73) Assignee: Dell Products, LP, Round Rock, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/733,768

(22) Filed: Jun. 8, 2015

(65) Prior Publication Data

US 2015/0271039 A1 Sep. 24, 2015

Related U.S. Application Data

(62) Division of application No. 13/431,708, filed on Mar. 27, 2012, now Pat. No. 9,054,895, which is a division of application No. 12/146,684, filed on Jun. 26, 2008, now Pat. No. 8,170,053.

(30) Foreign Application Priority Data

Mar. 24, 2008 (CN) .......................... 2008 1 0086633

(51) Int. Cl.
*H04L 12/28* (2006.01)
*H04L 12/66* (2006.01)
*H04L 12/26* (2006.01)
*H04L 12/46* (2006.01)
*H04L 12/54* (2013.01)
*H04L 12/931* (2013.01)

(52) U.S. Cl.
CPC ...... *H04L 43/0811* (2013.01); *H04L 12/4625* (2013.01); *H04L 12/5692* (2013.01); *H04L 49/351* (2013.01)

(58) Field of Classification Search
CPC .... H01R 24/64; H01R 27/00; H01R 13/6685; H01R 24/62; H04M 1/0293; H04M 11/066; H04M 1/2535
USPC .......................................... 370/419–421, 463
See application file for complete search history.

(56) References Cited

U.S. PATENT DOCUMENTS

| | | | |
|---|---|---|---|
| 6,059,583 A * | 5/2000 | Croft ...................... | H01R 35/02 439/131 |
| 6,544,076 B2 | 4/2003 | Pocrass | |
| 6,594,707 B1 * | 7/2003 | Rubinstein .............. | H04L 29/06 709/236 |
| 9,054,895 B2 * | 6/2015 | Chen ................... | H04L 12/4625 |

(Continued)

*Primary Examiner* — Thai Hoang
(74) *Attorney, Agent, or Firm* — Prol Intellectual Property Law, PLLC; H. Kenneth Prol

(57) ABSTRACT

A network interface module can include a housing including a first cavity configured to receive a first network plug having a first dimension. The housing also includes a second cavity within the first cavity, and configured to receive a second network plug having a second dimension that is less than the first dimension. The network interface module can also include a network detection circuit operatively connected to a first terminal within the housing.

20 Claims, 4 Drawing Sheets

(56) References Cited

U.S. PATENT DOCUMENTS

| | | | | |
|---|---|---|---|---|
| 2003/0013348 A1* | 1/2003 | Pocrass | .............. | H01R 13/7175 |
| | | | | 439/676 |
| 2004/0161964 A1* | 8/2004 | Liebenow | .............. | H01R 13/64 |
| | | | | 439/488 |
| 2006/0234564 A1* | 10/2006 | Pharn | ................... | H01R 13/641 |
| | | | | 439/676 |
| 2012/0183002 A1 | 7/2012 | Chen et al. | | |

* cited by examiner

NETWORK INTERFACE AND DETECTION MODULE TO ENABLE NETWORK COMMUNICATION WITHIN INFORMATION HANDLING SYSTEMS

CROSS REFERENCE TO RELATED APPLICATIONS

This application is a divisional of U.S. patent application Ser. No. 13/431,708, entitled "Network Interface and Detection Module to Enable Network Communication within Information Handling Systems," filed on Mar. 27, 2012, which is a divisional of U.S. patent application Ser. No. 12/146,684, filed on Jun. 26, 2008, and now U.S. Pat. No. 8,170,053, the disclosures of which are assigned to the current assignee hereof and hereby expressly incorporated by reference in their entirety.

This application claims priority to Chinese Patent Application No. 200810086633.3 filed on Mar. 24, 2008, entitled "Network Interface and Detection Module to Enable Network Communication within Information Handling Systems," now Chinese Patent Publication No. 101547123 A, published on Sep. 30, 2009, which is assigned to the current assignee hereof and is incorporated herein by reference in its entirety.

FIELD OF THE DISCLOSURE

This disclosure relates generally to information handling systems, and more particularly to a network interface and detection module to enable network communication within information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
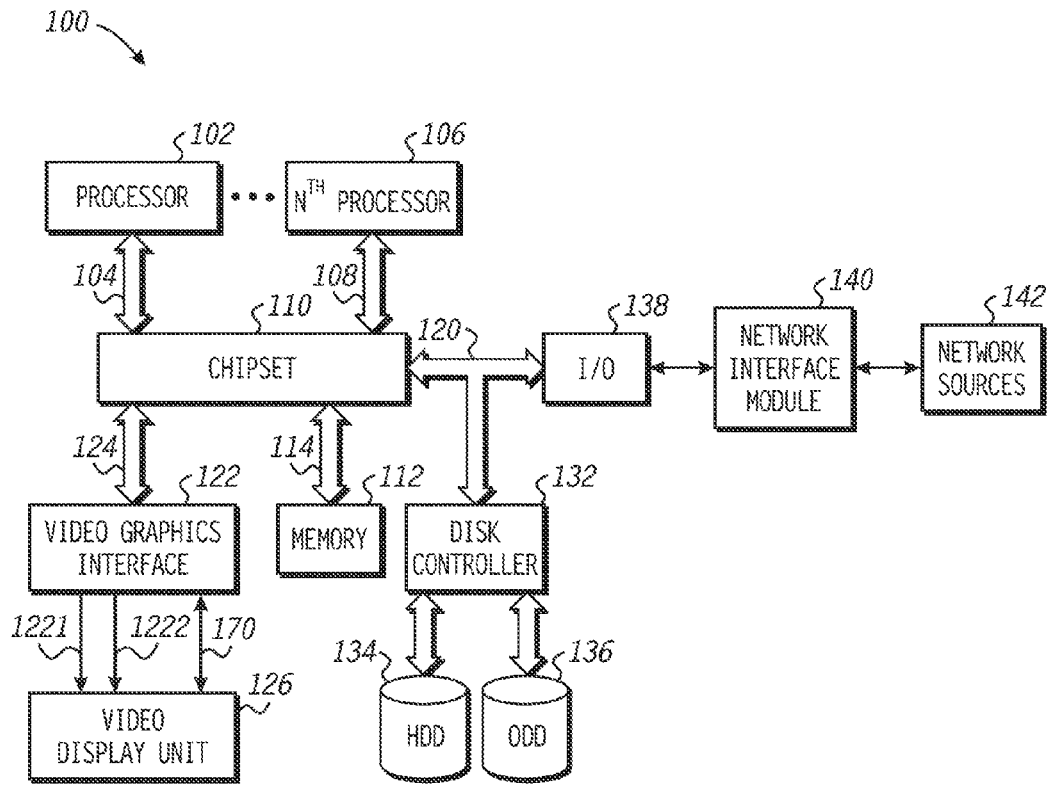
FIG. 1 illustrates a block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. The processors 102 and 106 can be separate physical processors, and in another embodiment, the processors 102 and 106 can be different cores within the same integrated circuit. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

In an embodiment, the chipset 110 can be referred to as a memory hub or a memory controller. For example, the chipset 110 can include an Accelerated Hub Architecture (AHA) that uses a dedicated bus to transfer data between the processors 102 and 106. For example, the chipset 110 including an AHA-enabled chipset can include a memory controller hub and an input/output (I/O) controller hub. As a memory controller hub, the chipset 110 can function to provide access to the processor 102 using the host bus 104 and the processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). For example, an Intel 820E, an 815E chipset, or any combination thereof, available from the Intel Corporation of Santa Clara, California, can provide at least a portion of the chipset 110. The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as video/graphics port 1221 and video/graphic port 1222, capable of providing image information substantially simultaneously to a common video/graphics display device 126 for substantially simultaneous display as described in greater detail herein. Also, each of the video/graphic ports 1221 and 1222 are capable of providing image information to separate video/graphic devices for substantially simultaneous display. The video/graphic display device 126 is also referred to herein as a display unit 126.

The display unit 126 can include one or more types of video/graphic display devices, such as a flat panel display (FPD) or other type of display device. In accordance with the present disclosure, the video/graphic interface module 122 can detect the presence of a cable adapter 170 and configure multiple video/graphic ports, such as DisplayPort video/graphic ports, to operate in tandem along with the cable adapter to implement a Dual-Link DVI video/graphic port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include an I/O module 138 coupled to the bus 120 and a network interface module 140. The network interface module 140 can include a network receptacle that enables access to two or more networks 142. For example, the network interface module 140 can include a combined RJ-45 and RJ-11 receptacle. When an RJ-45 plug is plugged into the receptacle of the network interface module 140, access to an Ethernet, local area network (LAN), wide area network, etc. can be enabled. In another form, when an RJ-11 plug is plugged into the receptacle of the network interface module 140, access to a telephone line can be enabled using the network interface module 140 and a modem communication module (not illustrated).

Figure 2:
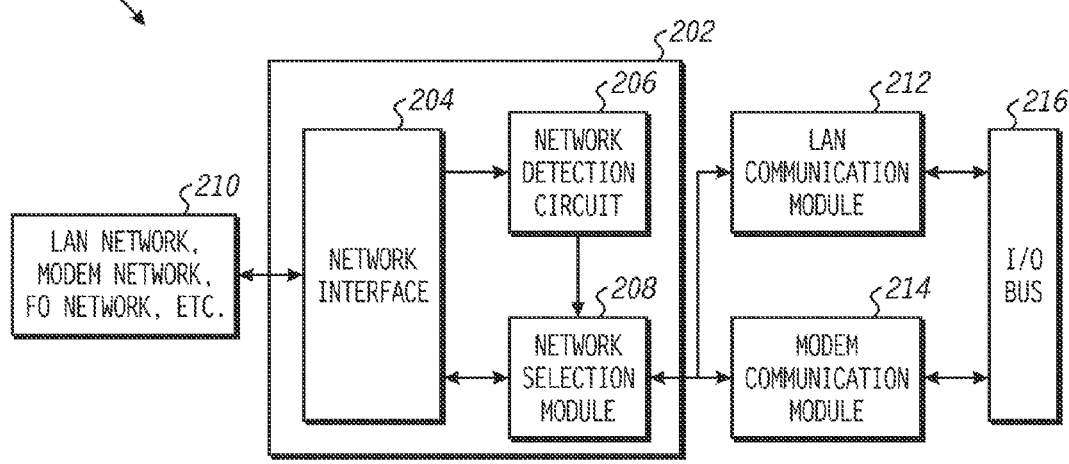
FIG. 2 illustrates a functional block diagram of a network detection and selection enabled information handling system according to an aspect of the disclosure.

FIG. 2 illustrates a functional block diagram of a network detection and selection enabled information handling system, illustrated generally in part at 200, according to an aspect of the disclosure. The information handling system 200 can include the information handling system 100 illustrated in FIG. 1, or any other information handling system operable to employ portions of all of FIG. 2. The information handling system includes a plural network access module 202 including a network interface 204, a network detection circuit 206, and a network selection module 208. The network interface 204 can include a communication interface configured to access two or more networks 210. For example, the network interface can be configured to couple two or more of a LAN network, modem-enabled network such as a telephone network, a fiber optic network, a cable network, a digital subscriber line (DSL) network, or any combination thereof. Various other networks can also be considered as needed or desired.

In a particular aspect, the plural network access module 202 can be coupled to one or more communication modules configured to communicate between a selected network and a communication or I/O bus of an information handling system. For example, the network selection module 208 can enable access to a LAN communication module 212, a modem communication module 214, or various other types of communication modules as needed or desired. In another form, the LAN communication module 212, the modem communication module 214, or any combination thereof can also include all, or portions of, the plural network access module 202.

During operation, a user can connect a plug to the network interface to access a specific type of network 210. The network interface 204 can couple an input signal to the network detection circuit 206 operable to a type of network connected to the network interface 204. For example, a user can connect an RJ-11 plug (not illustrated) into that network interface 204. The network interface 204 can couple a signal input by the RJ-11 plug and an associated network to the network detection circuit 206. The network detection circuit 206 can detect a network type, and communicate a signal to the network detection module 208. The network selection module 208 can enable use of a specific type of communication module associated with a detected network. For example, if a telephone network connection is detected, the network selection module 208 can enable access to the modem communication module 214. In a particular form, the network selection module 208 can enable use of one or more conductor, signal path, and the like sufficient to enable communication. For example, a telephone network including only two signals paths can be enabled by the network selection module 208. Various other combinations can also be enabled depending on the type of network as needed or desired.

In one form, a user may desire to access another network (e.g. a LAN network). As such, a user may remove an RJ-11 plug from the network interface 204 and couple an RJ-45 plug into the network interface 204 using the same receptacle. For example, the network interface 204 can include a receptacle configured to receive an RJ-11 plug in one instance, and an RJ-45 plug in another instance. As such, upon placing the RJ-45 plug that is coupled to a LAN network, or other type of Ethernet network, the network detection circuit 206 can detect the Ethernet network, and couple a selection signal to the network selection module 208. The network selection module 208 can then enable access to the LAN communication module 212 via the network interface 204. In this manner, a user can use either an RJ-11 plug to access a telephone network or an RJ-45 plug to access an Ethernet network using the same receptacle provided by the network interface module 204.

Figure 3:
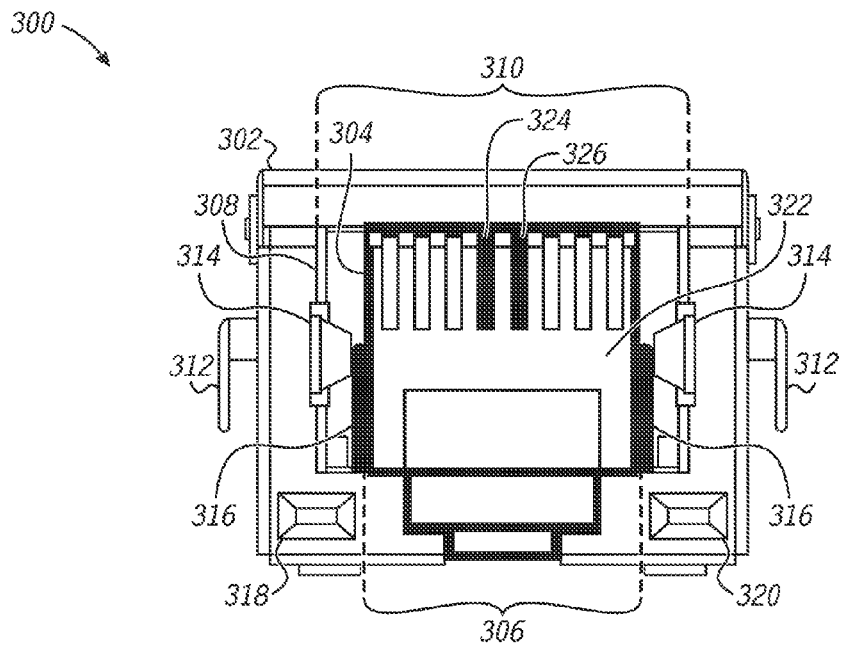
FIG. 3 illustrates a front view of a plural network interface receptacle according to an aspect of the disclosure.

FIG. 3 illustrates a front view of a plural network interface receptacle, illustrated generally as network receptacle 300, according to an aspect of the disclosure. The network receptacle 300 is configured to work with a RJ-11 plug and a RJ-45 plug. The network receptacle 300 can be modified to be used with other types of network plugs or connectors as desired.

According to an aspect, the network receptacle 300 includes a housing 302 having an first interior cavity portion 304 having a first width 306 sized to receive an RJ-11 plug (not illustrated). The housing 302 is also formed to include a second interior cavity portion 308 having a second width 310 sized to receive an RJ-45 plug (not illustrated). The network receptacle 300 also includes mounting brackets 312 to mount the network receptacle 300 to a computer housing (not illustrated). The network receptacle 300 further includes retention clips 314 configured to retain a network plug when coupled to the network receptacle 300. The network receptacle 300 also includes retractable guides 316 configured to partition the first interior cavity 304 to form the second interior cavity 308. The network receptacle 300 further includes a first display element 318 responsive to a first network plug type being inserted within the network receptacle 300. The network receptacle also includes a second display element 320 responsive to a second network plug type being inserted within the network receptacle 300. The network receptacle 300 also includes an array of contacts 322 that includes a first contact 324 and a second contact 326 operable to be used to detect a network plug connection.

During use, as an RJ-45 plug is inserted into the network receptacle 300, the RJ-45 plug engages the retractable guides, displacing the guides to form the first interior cavity 304 having the first width 310. As the RJ-45 plug is removed from the network receptacle 300, the retractable guides 316 extend to form the second interior cavity 304 having the second width 306. In this position, an RJ-11 plug can be inserted and the retractable guides 316 can remain in place to support an RJ-11 plug upon inserting.

Figure 4:
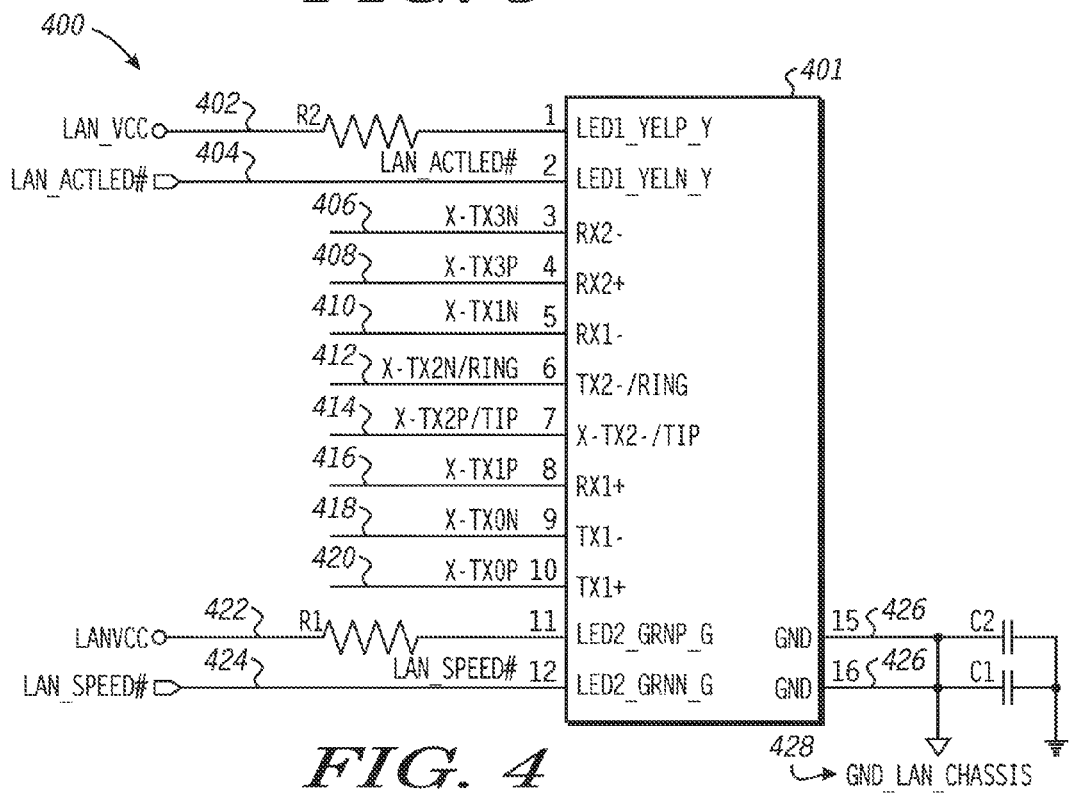
FIG. 4 illustrates a schematic diagram of a plural network interface receptacle according an aspect of the disclosure.

FIG. 4 illustrates a schematic diagram of a plural network interface receptacle according an aspect of the disclosure. The plural network interface receptacle, illustrated generally at 400, can be used with the network receptacle 300 illustrated in FIG. 3, or any other type of network receptacle that can embody portions or all of the plural network interface receptacle 400.

The plural network receptacle 400 includes a receptacle housing 402 configured to be coupled to a first contact 402 operable to couple a signal, such as a voltage, to an output element such as an LED coupled to the plural network receptacle 400 upon connecting to a LAN. The receptacle 400 can also include a LAN activation LED signal 404 operable to be used with the LAN VCC 402 when connected to an LAN. The receptacle 400 also includes a plurality of receive and transmit terminals configured to receive and transmit signals based on the type of network connection. The receptacle 400 includes a first signal terminal 406, a second signal terminal 408, a third signal terminal 410, a fourth signal terminal 412, a fifth signal terminal 414, a sixth signal terminal 416 a seventh signal terminal 418, and an eight signal terminal 420. The receptacle 400 also include a second LAN VCC signal terminal 422, and a LAN speed terminal 424. The receptacle further includes a chassis ground connection 426 configured to be coupled to a chassis ground 428.

According to a particular embodiment, the fourth signal terminal 418 and the fifth signal terminal 420 can be used to connect to an RJ-11 plug operable to be coupled to a telephone network, and to also be coupled to a LAN such as an Ethernet network. As such, the fourth signal terminal 418 and the fifth signal terminal 420 be used as a shared or multi-function signal terminal to communicate with a detected network.

Figure 5:
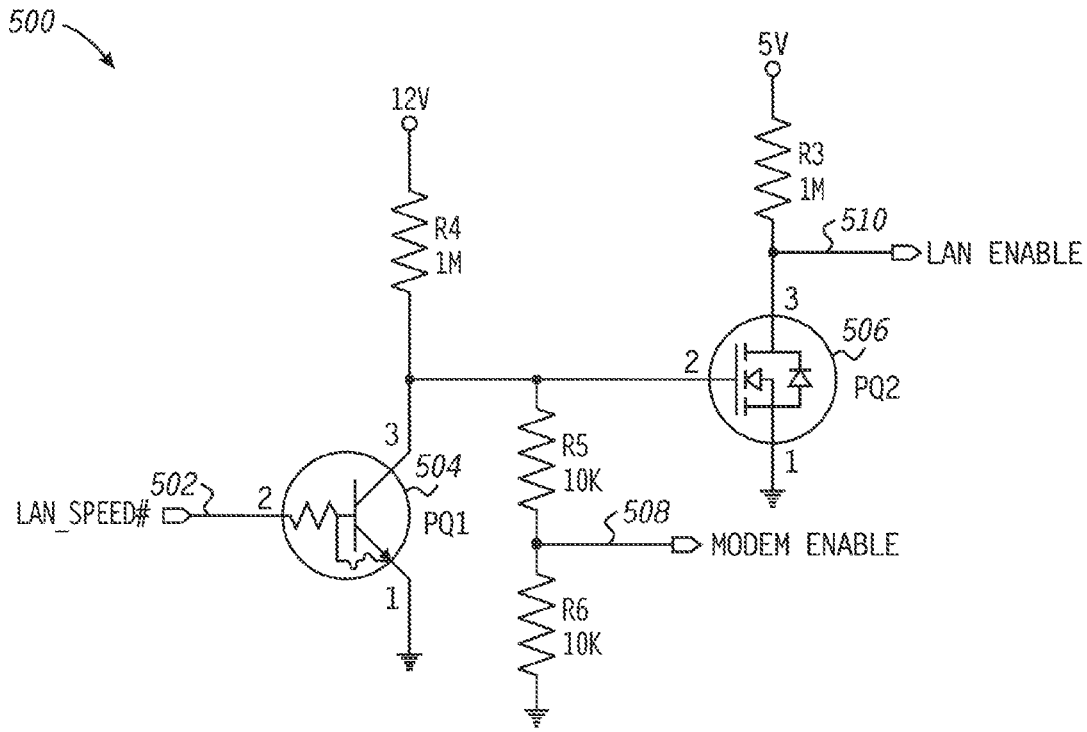
FIG. 5 illustrates a schematic diagram of a network detection circuit according an aspect of the disclosure.

FIG. 5 illustrates a schematic diagram of a network detection circuit, illustrated generally at 500, according an aspect of the disclosure. The network detection circuit 500 includes a LAN speed input signal 502 coupled to a first transistor 504. The LAN speed input signal 502 can be coupled to a signal terminal configured to input a LAN speed signal such as LAN speed signal terminal 424 illustrated in FIG. 4. The first transistor 504 can include model #DTC144EUA manufactured by ROHM. The output of the first transistor 504 is further coupled to a gate of a second transistor 506. The second transistor 506 can include model #2N7002E manufactured by VISHAY. The gate of the second transistor 506 is further coupled to a voltage divider that outputs a modem enable signal terminal 508 to enable modem communication. The source terminal of the second transistor 506 can further be coupled to a LAN enable signal terminal 510 to enable LAN communication.

During operation, when an RJ-11 connection is coupled to a network receptacle, a LAN speed signal may not be present at the LAN speed terminal 502. The LAN speed terminal 502 than places no voltage bias to the gate of the first transistor, pulling the gate of the second transistor to a high level. Additionally, the voltage divider circuit coupled to the modem enable signal terminal 508 is increased enabling modem communication by outputting a high modem signal. When a LAN speed signal is present at the LAN speed terminal 502, the first transistor 504 is activated and the voltage drops at the gate of the second transistor. In turn, the voltage level at the source of the second transistor 506 rises placing the LAN enable signal at the LAN enable signal terminal 510 to a high level, enabling LAN communication.

Figure 6:
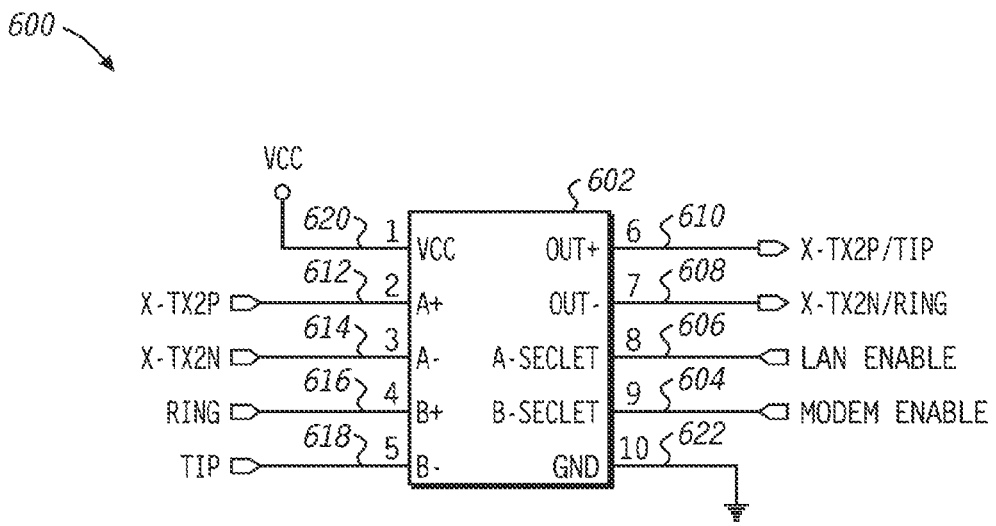
FIG. 6 illustrates a block diagram of a network selection module according to another aspect of the disclosure.

FIG. 6 illustrates a block diagram of a network selection module, illustrated generally at 600, according to another aspect of the disclosure. The network selection module 600 includes a network switch 602 including plural input and output terminals. For example, the network switch 602 includes a modem enable terminal 604 operable to be coupled to the modem enable signal terminal 508 of FIG. 5. The network switch 602 also includes a LAN enable terminal 606 operable to be coupled to the LAN enable signal output terminal 510 illustrated in FIG. 5. The network switch 600 also includes first multi-signal terminal 608 operable to communicate LAN transmission signals during LAN communication and output a ring signal during modem communication. The network switch 600 further includes second multi-signal terminal 610 operable to communicate LAN transmission signals during LAN communication and output a tip signal during modem communication.

According to a further aspect, the network switch 600 includes inputs including a first LAN input signal 612 and a second LAN input signal 614. The network switch 600 further includes a first modem input signal 616 and a second modem input signal 618. A power source 620 and ground 622 can be used to power the network switch 602.

During use, a network detection circuit such as network detection circuit 500 illustrated in FIG. 5, can couple an input to enable LAN communication or modem communication. If LAN communication is enabled, the signal present at the first LAN input terminal 612 can be coupled to the first multi-output terminal 610. Additionally, the signal present at the second LAN input terminal 614 can be coupled to the second multi-output terminal 608. Each LAN signal can then be output to a LAN communication module and processed accordingly.

In another form, a network detection circuit such as network detection circuit 500 illustrated in FIG. 5, can couple an input to enable LAN communication or modem communication. If modem communication is enabled, the signal present at the first modem input terminal 616 can be coupled to the first multi-output terminal 610. Additionally, the signal present at the second modem input terminal 614 can be coupled to the second multi-output terminal 608. Each modem signal can then be output to a modem communication module and processed accordingly.

Figure 7:
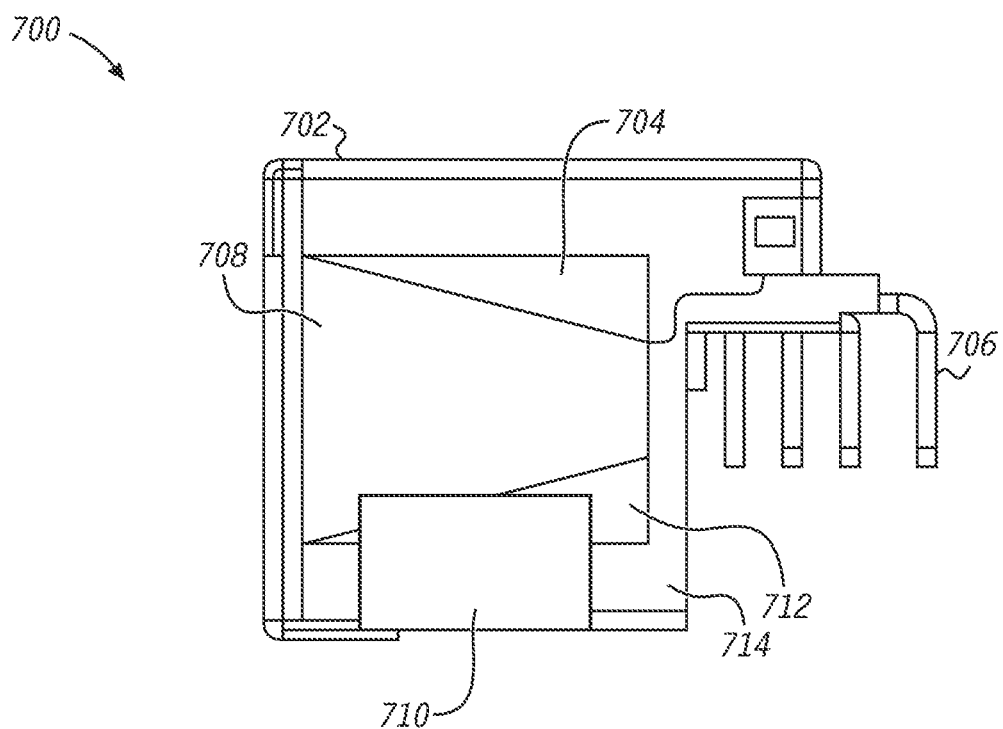
FIG. 7 illustrates a side view of a plural network interface receptacle according to an aspect of the disclosure.

FIG. 7 illustrates a side view of a plural network interface receptacle, illustrated generally as receptacle 700, according to an aspect of the disclosure. The receptacle 700 includes a top portion 702, a contact 704, a device mount 706 configured to couple the receptacle 700 to a circuit card (not illustrated). The receptacle 700 also includes a cavity 708 sized to allow separate insertion of an RJ-11 and RJ-45 plugs (not illustrated). The receptacle 700 also includes a guide block 710 and a retractable guide 712. The retractable guide 712 can be retracted into a lower portion 714 of the receptacle when an RJ-45 plug is inserted into the cavity 708. Additionally, as an RJ-45 plug is removed from the cavity 708, the retractable guide 714 extends upward and serves as a guide when an RJ-11 plug is inserted into the cavity 708. According to an aspect, the contacts 704 and the retractable guide 712 can be formed from the same material and include similar of the same dimensions.

Figure 8:
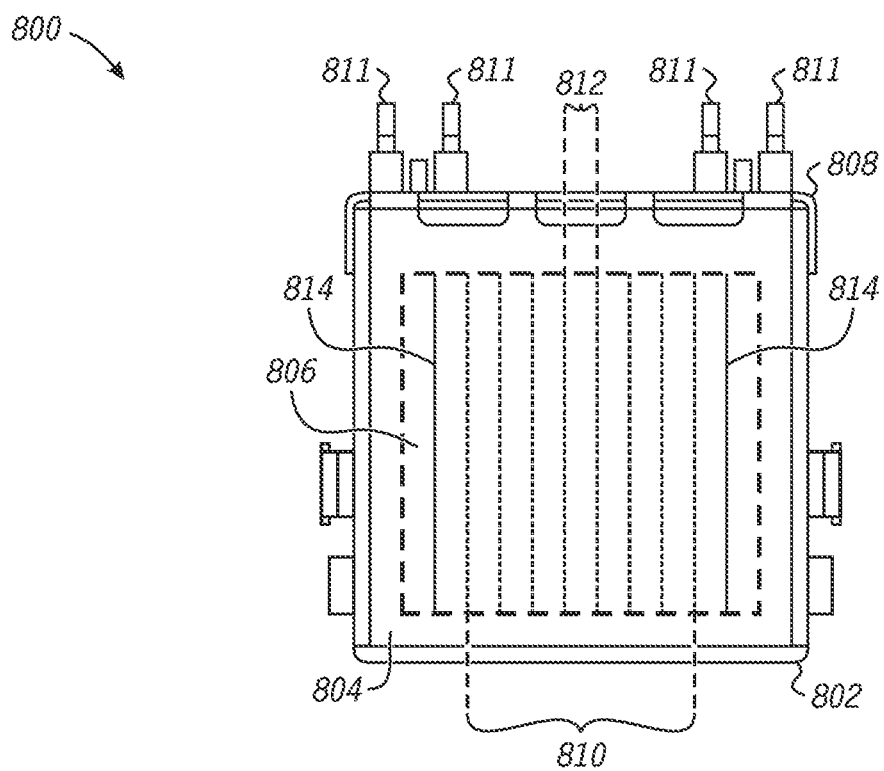
FIG. 8 illustrates a top view of a plural network interface receptacle according to an aspect of the disclosure.

FIG. 8 illustrates a top view of a plural network interface receptacle, illustrated generally as receptacle 800, according to an aspect of the disclosure. The receptacle 800, includes a front portion 802 including an opening 804 to enable insertion of network plug such as an RJ-11 plug or an RJ-45 plug into a cavity 806. The receptacle 800 also includes a rear portion 808 including mounts 810 configured to be mounted to a printed circuit board (not illustrated). The receptacle 800 also includes plural contacts 810 configured to interface with an RJ-11 plug or an RJ-45 plug. The plural contacts 810 includes two shared contacts 812 configured to be used when either an RJ-11 plug or an RJ-45 plug is inserted into the receptacle 800. The receptacle 800 also includes two retractable guides 814 configured to retract into a lower portion of the receptacle as an RJ-45 plug is inserted into the cavity 806.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network selection circuit comprising:
a first enable terminal operatively connected to a network detection circuit operable to detect availability of a first network of a plurality of networks; and a switch circuit operatively connected to the first enable terminal, wherein the switch circuit is operable to output a signal of a second network in response to not detecting an availability of the first network.

2. The network selection circuit of claim 1, further comprising:
a first multi-signal input terminal operatively connected to the switch circuit;
a second multi-signal input terminal operatively connected to the switch circuit;
a first multi-signal output terminal operatively connected to the switch circuit, the first multi-signal output terminal operable to output a first signal of the first network in response to the network detection circuit detecting the first network; and
a second multi-signal output terminal operatively connected to the switch circuit, wherein the second multi-signal output terminal is operable to output a second signal of the first network in response to the network detection circuit detecting the first network.

3. The network selection circuit of claim 2, further comprising:
a third multi-signal input terminal operatively connected to the switch circuit; and
a fourth multi-signal input terminal operatively connected to the switch circuit.

4. The network selection circuit of claim 2, wherein the first multi-signal output terminal is operable to output a first signal of a second network in response to not detecting an availability of the first network, and wherein the second multi-signal output terminal is operable to output a second signal of the second network in response to not detecting availability of the first network.

5. The network selection circuit of claim 1, further comprising:
a combined RJ-11 and RJ-45 receptacle operatively connected to the network detection circuit; and
wherein the combined RJ-11 and RJ-45 receptacle further includes a first terminal operable to be operatively connected to the network detection circuit.

6. The network selection circuit of claim 2, wherein the first multi-signal output terminal of the switch circuit is operable to connect a LAN signal to a LAN communication module in response to the network detection circuit detecting a LAN, and the first multi-signal output terminal of the switch circuit is operable to connect a modem signal to a modem communication module in response to the network detection circuit not detecting the LAN.

7. The network selection circuit of claim 1, wherein the switch circuit is a network selection module operatively connected to the network detection circuit for receiving an enable signal for the first network from the first enable terminal.

8. The network selection circuit of claim 1, wherein the switch circuit is a network selection module operatively connected to the network detection circuit for receiving an enable signal for the second network from a second enable terminal.

9. A network selection circuit comprising:
a first network indicator terminal operatively connected to a network detection circuit operable to detect availability of a first network of a plurality of networks; and
a switch circuit operatively connected to a first enable terminal, wherein the switch circuit is operable to output a signal of a second network in response to not detecting an availability of the first network.

10. The network selection circuit of claim 9, wherein the first network indicator terminal receives a LAN speed signal indicating a LAN.

11. The network selection circuit of claim 9, wherein the first network indicator terminal receives a first network indicator signal in response to an RJ-45 plug engaged with a combined RJ-11 and RJ-45 receptacle.

12. The network selection circuit of claim 9, further comprising:
a combined RJ-11 and RJ-45 receptacle operatively connected to the network detection circuit; and
wherein the first network indicator terminal receives a first network indicator signal in response to an RJ-45 plug engaged with the combined RJ-11 and RJ-45 receptacle.

13. The network selection circuit of claim 9, further comprising:
a first multi-signal input terminal operatively connected to the switch circuit;
a second multi-signal input terminal operatively connected to the switch circuit;
a first multi-signal output terminal operatively connected to the switch circuit, the first multi-signal output terminal operable to output a first signal of the first network in response to the network detection circuit detecting availability of the first network; and
a second multi-signal output terminal operatively connected to the switch circuit, wherein the second multi-signal output terminal is operable to output a second signal of the first network in response to the network detection circuit detecting availability of the first network.

14. The network selection circuit of claim 13, wherein the first multi-signal output terminal is operable to output a first signal of a second network in response to not detecting an availability of the first network, and wherein the second multi-signal output terminal is operable to output a second signal of the second network in response to not detecting an availability of the first network.

15. The network selection circuit of claim 13, wherein the first multi-signal output terminal of the switch circuit is operable to connect a LAN signal to a LAN communication module in response to the network detection circuit detecting a LAN, and the first multi-signal output terminal of the switch circuit is operable to connect a modem signal to a modem communication module in response to the network detection circuit not detecting the LAN.

16. A network interface module comprising:
a housing including a first cavity configured to receive a first network plug having a first dimension, and a second cavity within the first cavity configured to receive a second network plug having a second dimension that is less than the first dimension;
a first network indicator terminal operatively connected to a network detection circuit operable to detect availability of a first network of a plurality of networks; and
a switch circuit operatively connected to a first enable terminal, wherein the switch circuit is operable to output a signal of a second network in response to not detecting an availability of the first network.

17. The network interface module of claim 16, wherein the first network indicator terminal receives a LAN speed signal indicating a LAN.

18. The network interface module of claim 16, wherein the first network indicator terminal receives a first network indicator signal in response to receiving the first network plug that is an RJ-45 plug.

19. The network interface module of claim 16, further comprising:
- a first multi-signal input terminal operatively connected to the switch circuit;
- a second multi-signal input terminal operatively connected to the switch circuit;
- a first multi-signal output terminal operatively connected to the switch circuit, the first multi-signal output terminal operable to output a first signal of the first network in response to the network detection circuit detecting availability of the first network; and
- a second multi-signal output terminal operatively connected to the switch circuit, wherein the second multi-signal output terminal is operable to output a second signal of the first network in response to the network detection circuit detecting availability of the first network.

20. The network interface module of claim 19, wherein the first multi-signal output terminal is operable to output a first signal of a second network in response to not detecting an availability of the first network, and wherein the second multi-signal output terminal is operable to output a second signal of the second network in response to not detecting an availability of the first network.

\* \* \* \* \*